United States Patent
Ramalingam et al.

(10) Patent No.: US 9,183,635 B2
(45) Date of Patent: Nov. 10, 2015

(54) METHOD FOR RECONSTRUCTING 3D LINES FROM 2D LINES IN AN IMAGE

(71) Applicant: Mitsubishi Electric Research Laboratories, Inc., Cambridge, MA (US)

(72) Inventors: Srikumar Ramalingam, Cambridge, MA (US); Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 87 days.

(21) Appl. No.: 13/897,675

(22) Filed: May 20, 2013

(65) Prior Publication Data
US 2014/0341463 A1    Nov. 20, 2014

(51) Int. Cl.
G06K 9/00 (2006.01)
G06T 7/00 (2006.01)

(52) U.S. Cl.
CPC ............. *G06T 7/0061* (2013.01); *G06T 7/0063* (2013.01)

(58) Field of Classification Search
CPC .................................. G06T 7/00; G06T 15/10
USPC ......................................................... 382/154
See application file for complete search history.

(56) References Cited

U.S. PATENT DOCUMENTS

| | | | | |
|---|---|---|---|---|
| 6,700,578 B2* | 3/2004 | Kamata et al. | | 345/473 |
| 7,023,432 B2* | 4/2006 | Fletcher et al. | | 345/419 |
| 7,639,250 B2* | 12/2009 | Xu et al. | | 345/419 |
| 8,396,285 B2* | 3/2013 | Maurer et al. | | 382/154 |
| 8,396,329 B2* | 3/2013 | Brooksby et al. | | 382/294 |
| 8,717,632 B2* | 5/2014 | Zheng et al. | | 358/3.26 |
| 8,933,925 B2* | 1/2015 | Sinha et al. | | 345/419 |
| 2007/0075997 A1* | 4/2007 | Rohaly et al. | | 345/419 |
| 2011/0311104 A1* | 12/2011 | Sinha et al. | | 382/106 |
| 2012/0243774 A1* | 9/2012 | Chen et al. | | 382/154 |
| 2012/0320162 A1* | 12/2012 | Lo et al. | | 348/47 |
| 2014/0253552 A1* | 9/2014 | Agarwala | | 345/427 |
| 2014/0333615 A1* | 11/2014 | Ramalingam et al. | | 345/420 |

OTHER PUBLICATIONS

K. Sugihara, "Machine interpretation of line drawings," MIT Press, 1986.
A. Criminisi, I. Reid and A. Zisserman, "Single view metrology," IJCV, 2000.
V. Hedau, D. Hoiem, and D.A. Forsyth, "Recovering the Spatial Layout of Cluttered Rooms," ICCV 2009.
D. Hoiem, A.A. Efros, and M. Hebert, "Recovering Surface Layout from an Image," IJCV, 2007.

* cited by examiner

*Primary Examiner* — Gregory M Desire
(74) *Attorney, Agent, or Firm* — Dirk Brinkman; Gene Vinokur

(57) ABSTRACT

A method for reconstructing—three-dimensional (3D) lines in a 3D world coordinate system from two-dimensional (2D) lines in a single image of scene detects and clusters the 2D lines using vanishing points. A constraint graph of vertices and edges is generated, wherein the vertices represent the 2D lines, and the edges represents constraints on the 2D lines, then identifying the 3D lines that satisfy the constraints and reconstructing the 3D lines using the identified constraints.

12 Claims, 7 Drawing Sheets

METHOD FOR RECONSTRUCTING 3D LINES FROM 2D LINES IN AN IMAGE

FIELD OF THE INVENTION

The invention relates generally to computer vision, and more particularly to reconstructing 3D lines in a 3D world coordinate system from 2D lines in a single 2D image so that the 3D lines can be used for scene reconstructing.

BACKGROUND OF THE INVENTION

A fundamental problem in computer vision is single view reconstruction (SVR). SVR deals with the problem of recovering a 3D real world scene from a single 2D image.

In a 2D image of an indoor or outdoor scene including man-made structures, e.g., buildings and rooms, the predominant features are 3D lines in three orthogonal directions. It is relatively easy to determine when the lines intersect in the image. However, this does not necessarily mean that the corresponding lines intersect in the 3D real world.

A trivial counterexample are lines that share a common vanishing point in the image. Those lines appear to intersect at the vanishing point, but none intersect in the real world, where the lines are parallel to each other. Thus, identifying when apparent intersections in images correspond to real world intersections is difficult. There are several challenges to infer the 3D structure of lines.

The biggest challenge is with occluding edges in the image that produce false intersections. Line detection methods in real images often, miss important lines and produce spurious lines. Detected lines are often broken or cropped to obliterate any evidence of intersections. In addition, real world scenes are particularly challenging due to clutter.

SVR is a distinctly unsolved problem in computer vision. The reconstruction can be geometric or semantic. The most common geometric reconstruction method is based on labeling lines as convex, concave or occluding lines. The line labeling problem is in general NP-hard. Several challenging line drawings have been studied and novel constraint satisfaction methods have been developed to solve the SVR problem. Those methods primarily operate on synthetic or computer generated line drawings, and are generally unsatisfactory for real world images. Most other geometrical single-view reconstruction methods that give good results for real images rely on some kind of user interaction.

There is a renewed interest in the SVR problem as more holistic approaches become available. For example, pixels in the image can be classified, as sky, buildings and ground. That classification, along with an estimation of surface orientations, can produce 3D models that are sufficient for several applications such as synthesizing, walkthroughs, stereoscopic content generation for movies, and 3D context for object detection and recognition. The methods used for such coarse modeling uses several geometrical and image features.

Along with several image features and weak assumptions on coplanarity and colinearity, one method estimates depth from a single image. Another method approximates a room geometry using a cuboid and samples different hypotheses and selects the best one based on several image and geometrical features. Clutter in indoor scenes has been modeled as cuboids and reconstructed in 3D.

Being a severely ill-posed problem, SVR has led to several solutions, such as the computation of orientation maps, inferring geometry from human activities, explicit use of boundary information, template 3D shapes and even physics-driven stability and mechanical constraints.

Performance can be significantly improved by using optimization strategies for exactly inferring layouts from a larger solution space. Constraints based on Manhattan assumptions have been used for modeling buildings from aerial photos.

SUMMARY OF THE INVENTION

The embodiments of the invention provide a method for reconstructing 3D lines in a 3D world coordinate system from 2D lines extracted from a single 2D image. The 3D lines can be used for scene reconstruction. The method is based on a 3D reconstruction of lines extracted from the 2D image, using vanishing points, orthogonal structures, and an optimization procedure that considers all plausible connectivity constraints between lines.

Lines that substantially intersect at junctions in the image are identified. However, only a relatively small number of the junctions correspond to real intersections in the 3D scene. The method uses linear programming (LP) to identify a minimal number of least-violated connectivity constraints that are sufficient to unambiguously reconstruct the lines.

In contrast with known LP solutions, which primarily focus on well-behaved synthetic (graphics) line drawings with severely restricting assumptions, the method can reconstruct scene from real-world images.

DETAILED DESCRIPTION OF THE PREFERRED EMBODIMENTS

The embodiments of our invention provide a method for reconstructing 3D lines in a 3D world coordinate system from 2D lines in a single image. The reconstructed lines can then be used to reconstruct a three-dimensional (3D) scene from the 2D image.

Figure 1:
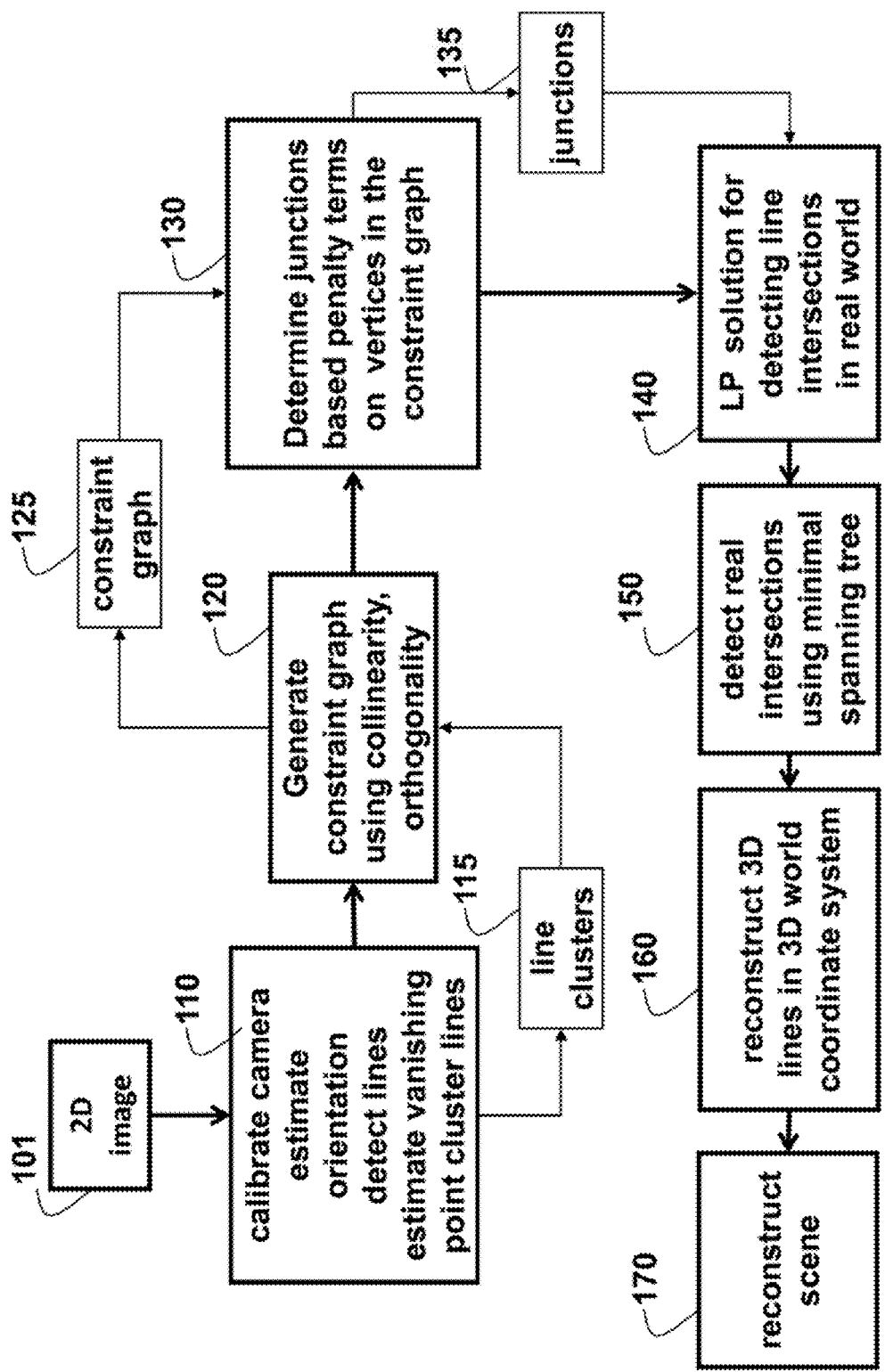
FIG. 1 is a block diagram of a method for reconstructing the 3D lines in a 3D world coordinate system from 2D lines in a single 2D image according to embodiments of the invention.

FIG. 1 shows the line extraction method. After camera calibration and estimating an orientation of the 2D image 101, lines are detected, vanishing points are estimated, and lines are clustered 110. From the line clusters 115, we generate 120 a constraint graph 125 using colinearity and orthogonality constraints. From the graph, we determine 130 junction 135 based penalty terms for vertices in the constraint graph.

Linear programming (LP) 140 and a minimal spanning tree 150 are used to reconstruct 160 the 3D lines in a 3D world coordinate system. The 3D lines can then be used to reconstruct 170 the scene.

These steps are now described in greater detail. The steps can be performed in a processor connected to memory and input/output interlaces as known in the art.

Camera Alignment

Our method uses a 3D world (Manhattan) coordinate system where every 3D line is aligned along one of three orthogonal axes. To achieve this, we determine the camera orientation with respect to the world and perform the necessary rotation.

We determine three vanishing points $vp_x$, $vp_y$ and $vp_z$. Using two of the vanishing points, we can determine the rotation R between the 2D camera coordinate system to the 3D world coordinate system. This rotation is used to orient the camera rays such that the lines we reconstruct are aligned with the real word coordinate system.

For a calibrated camera with camera matrix K, every pixel $p(x, y)$ in the image plane corresponds to a 3D projection ray in the world coordinate system that is given by a unit vector: $d_p = RK^{-1}(x\ y\ 1)^T$. Let $d_{xp}$, $d_{yp}$ and $d_{zp}$ denote the x, y and z components of the direction vector $d_p$.

Extracting Lines

In SVR for line drawings, junctions and line labels can be used to understand the structure of a 3D object. Junctions are points where two or more lines intersect. Based on the angle and the orientations of the lines in the 2D image coordinate system, junctions can be classified into as L, T, Y or W.

Figures 2A, 2B, 2C:
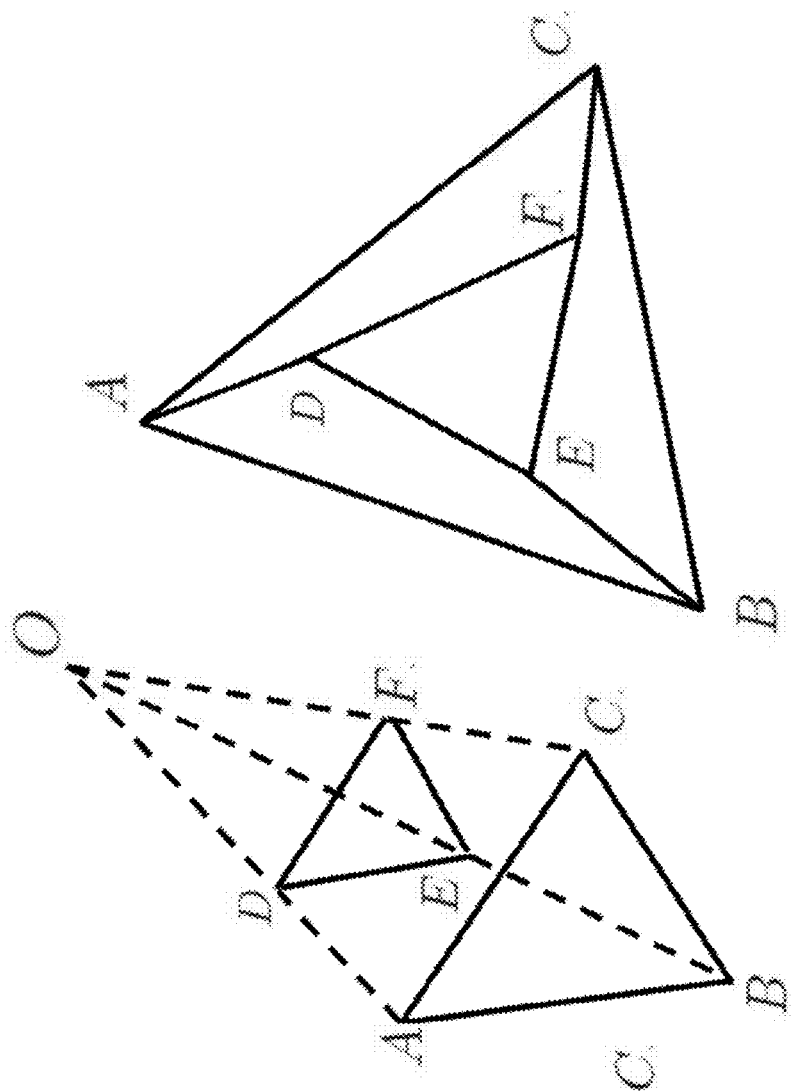
FIGS. 2A, 2B and 2C are synthetic line drawings of a truncated tetrahedron.

FIGS. 2A, 2B and 2C show a line drawing of a truncated tetrahedron. The vertices A, B and C correspond to W junctions and the vertices D, E and F correspond to Y junctions. It is straightforward to detect junctions in synthetic line drawings. After the junctions are detected, the incident lines are labelled to denote convex (+), concave (−) and occluding lines (←→). The directions of the occluding labels indicate the occluding plane.

Using camera calibration, projection rays for every pixel in the image are known. All the constraints from the line drawing in 3D space are linear inequalities. For example, the quadruplet (A,B,E,D) lies on a single plane. The line labeling forces D to be closer to the camera than A. Such constraints can be written in the form of linear inequalities. If linear program has a feasible solution, then the line drawing is physically realizable. By studying the rank of these linear systems, we can understand when the line drawings have multiple 3D interpretations, or not.

We produce a system of linear inequalities to extract the 3D points along the projection rays. Our solution is different from the conventional solution because real world images pose a completely different set of challenges that are hard to model using only geometrical and combinatorial structures.

Figure 3:
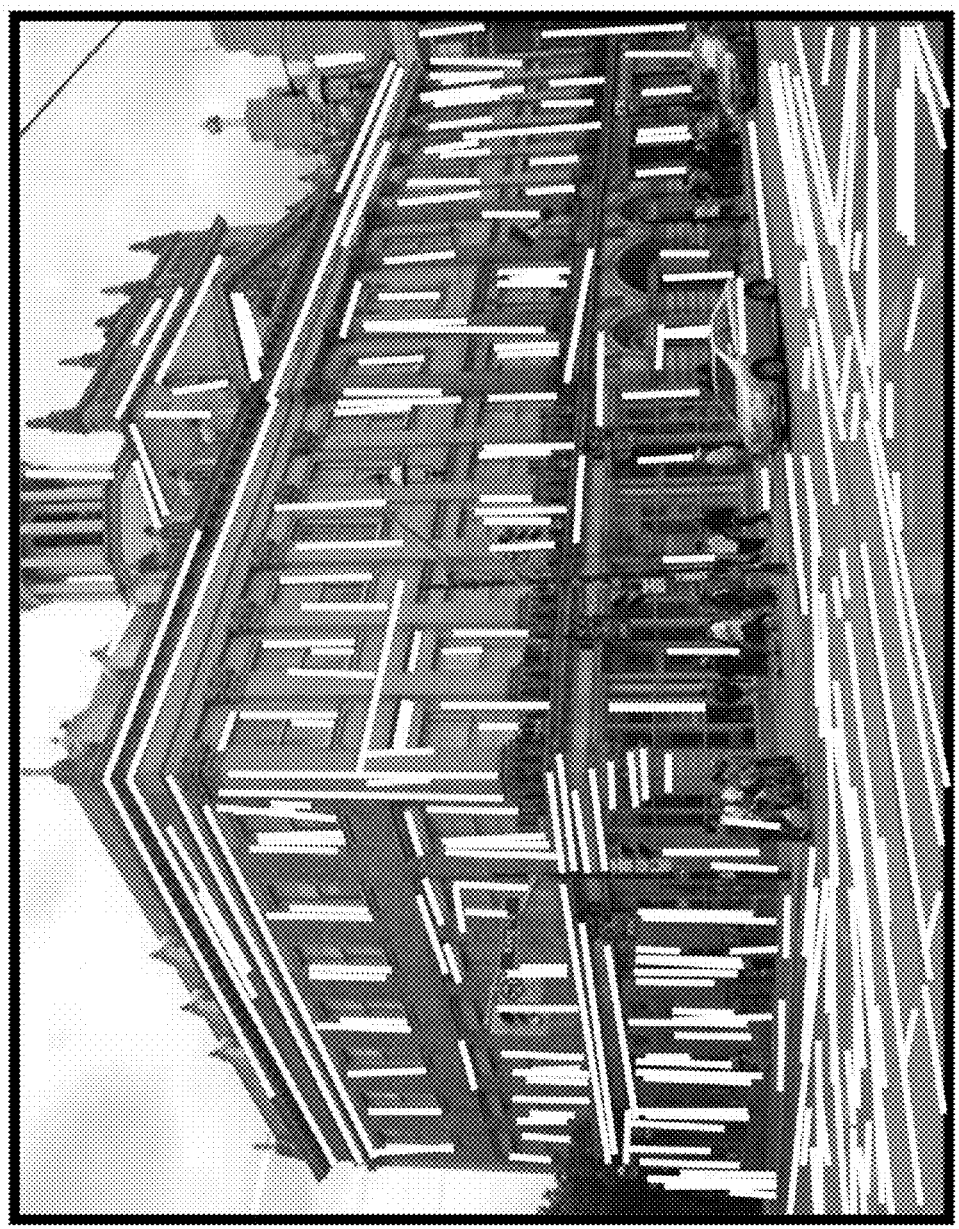
FIG. 3 is a 2D image of an outdoor scene including lines according to embodiments of the invention.

FIG. 3 shows an image of a 3D scene with building and lines. It is not easy to know which 3D points lie on a plane in this real world image, and which points do not. Due to missing and spurious lines, we cannot detect junctions with a very high confidence.

We do not have planarity constraints or hard inequalities from detected junctions. Furthermore, real scenes have many false intersections that always lead to infeasible solutions. To address these real world challenges, we do not derive any hard constraints from apparent junctions. Instead, evidence about junctions is used to inform the penalty terms in the LP to obtain a consistent 3D structure.

Constraint Graph

Real world images as in FIG. 3 pose several challenges for line detection. As a result, line detectors generally provide missing, spurious and broken lines. We consider connectivity constraints between two lines when a shortest distance between the lines is less than a threshold. We consider two types of connectivity. Two orthogonal lines can intersect at an intersection point. Two collinear lines can be extended to meet at an incidence point.

The intersections and incidences provide coupling constraints to reconstruct the 3D lines in the 3D world coordinate system from the 2D lines in the 2D image. The incidence relationship also connects two lines coming from two different objects that are collinear in the world coordinate system. Such relationships can be used to construct connected graphs.

However, accidental colinearities can occur in real images. This is still acceptable. Our LP formulation is designed to handle constraints that may not be true by using penalty terms based on the junctions. The constraints we use in the LP is the direction constraint that depends only on a point and a line. This constraints are independent of whether a point is an intersection or an incidence.

Figure 4:
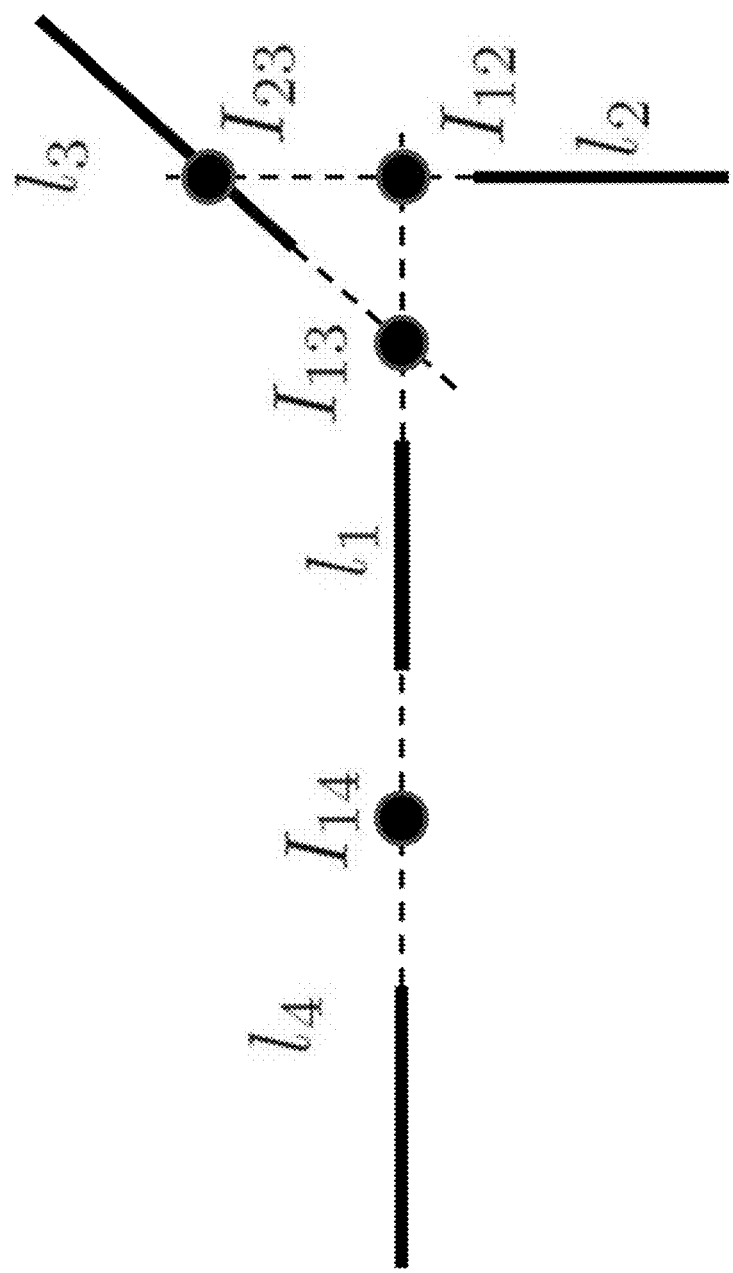
FIG. 4 is a schematic of lines, intersections and constraints according to embodiments of the invention.

As shown in FIG. 4, we use a unified representation to denote the constraints. Let n denote the number of lines in an image, and $l_i$ the line with index i. Let m denote the total number of intersections and incidences. We can represent the intersection and incidence relationship using a constraint graph $G=(V, E)$ where vertices $V=\{1, 2, \ldots, n\}$ denote the lines, and edges $(i,j) \in E$ denote the intersection or incidence between lines $l_i$ and $l_j$. We show four lines $l_1$, $l_2$, $l_3$ and $l_4$. These lines lead to three intersections $I_{12}$, $I_{13}$ and $I_{14}$. Lines $l_1$ and $l_4$ are collinear and these lines lead to a point of incidence $I_{14}$. The vertices and edges of the graph are given by $V=(1,2,3,4)$ and $E=\{(1,2)(1,3),(1,4),(2,3)\}$ respectively.

Figure 5:
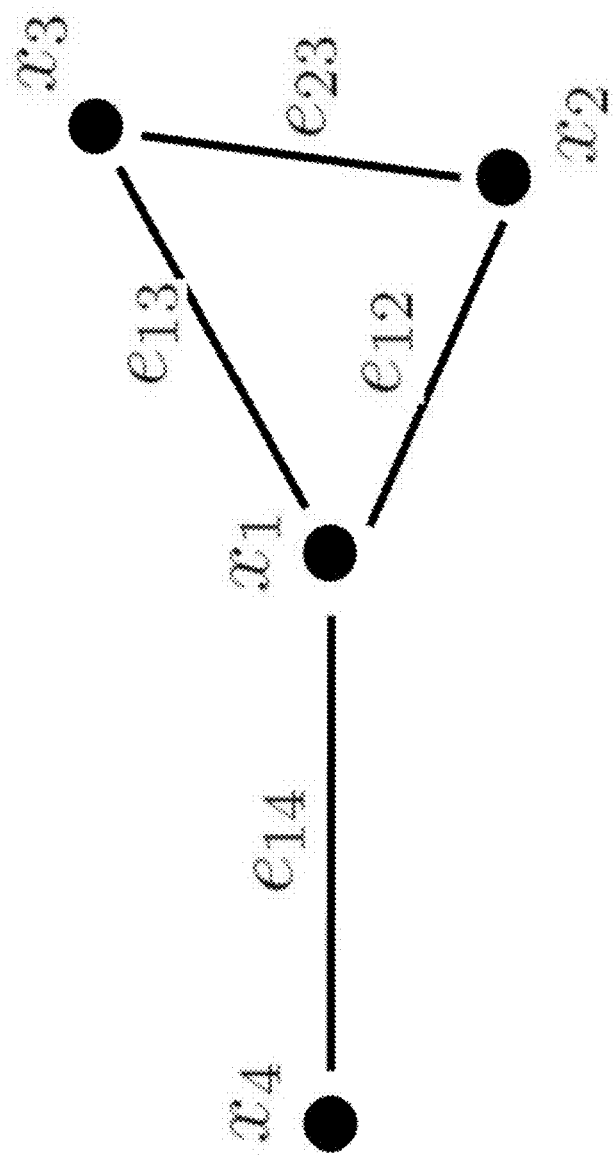
FIG. 5 is a constraint graph according to embodiments of the invention.

As shown in FIG. 5, all the lines in the image are vertices $(x_1, x_2, x_3, x_4)$ and all the intersections and incidences are edges $(e12, e13, e_{14}, e_{23})$ the constraint graph.

Linear Program

Figure 6:
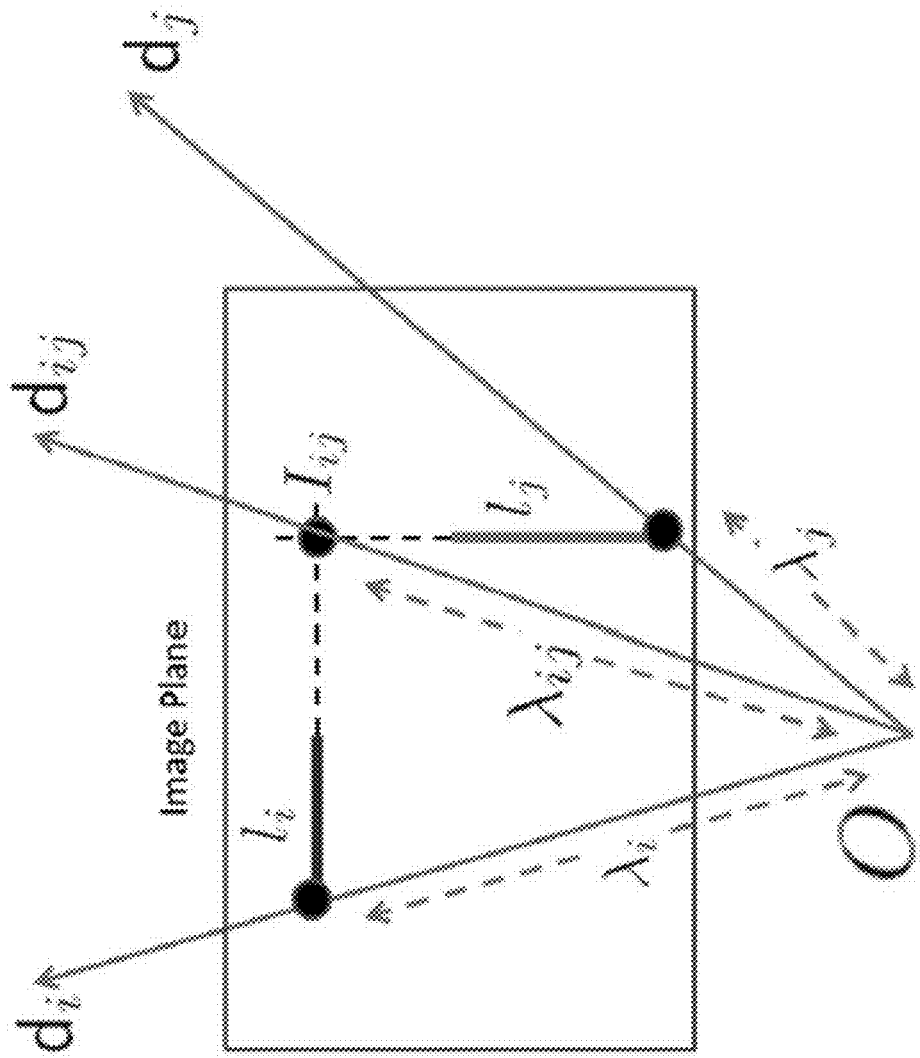
FIG. 6 is a schematic of intersecting lines in an image plane according to embodiments of the invention.

As shown in FIG. 6, a 3D point corresponding to a pixel lies on its projection ray and the point can be represented by $\lambda d_p$, where $\lambda$ is an unknown scale parameter that is equal to the distance of the 3D point from the camera center. In general, to reconstruct a 3D line from a 2D image line, we require two parameters to reconstruct both end points in 3D space. However, reconstructing one point is sufficient to recover the other point under the Manhattan world assumption. In our formulation, we use a single parameter $\lambda_i$ to denote the scale for one of the end points of the line.

In FIG. 6, we show two lines $l_i$ and $l_j$ that intersect at point $I_{ij}$. With respect to the constraint graph $G=(V,E)$, we have one unknown $\lambda_i$ for every vertex $i \in V$, and one unknown $\lambda_{ij}$ for every edge $(i,j) \in E$. Every intersection or incidence $I_{ij}$ independently lies on both the 3D lines corresponding to image lines $l_i$ and $l_j$. Thus, the vector $\lambda_i d_i - \lambda_{ij} d_{ij}$ is aligned along the direction of the 3D line corresponding to line $l_i$. Similarly, the vector $\lambda_j d_j - \lambda_{ij} d_{ij}$ is aligned along the direction of the 3D line corresponding to the line $l_j$.

This property is used as a constraint in reconstructing the lines. Our goal is to determine the unknown parameters, such that we satisfy the maximum number of such constraints in the following optimization problem $$\min \sum_{(i,j) \in E, k \in \{1,2\}} (\|s_{ijk}\|_0) \quad (1)$$

$$s.t\ |h_i d_{ai} - \lambda_{ij} d_{aij}| \leq s_{ij1},\ a \neq A_i$$

$$|\lambda_j d_{aj} - \lambda_{ij} d_{aij}| \leq s_{ij2},\ a \neq A_j$$

$$\lambda_i \geq 1 \quad (2)$$

$$\lambda_{ij} \geq 1,$$

where $a, A_i \in \{x,y,z\}$ and $A_i$ correspond to the orientation of $l_i$. From the single 2D image, the reconstruction is only possible up to an unknown global scale. The constraints $\lambda_i, \lambda_{ij} \geq 1$ ensures that the lines are at least unit distance from the camera and also in front of the camera. We have two slack variables $s_{ij1}$ and $s_{ij2}$ for every edge (i,j).

Instead of solving the original $\mathcal{L}_0$ norm maximization problem, we solve the following minimization using LP $$\min \sum_{(i,j)\in E, k\in\{1,2\}} w_{ij}(\|s_{ijk}\|_1) \quad (3)$$

$$s.t \ |\lambda_i d_{ai} - \lambda_{ij} d_{aij}| \leq s_{ij1}, \ a \neq A_i$$

$$|\lambda_j d_{aj} - \lambda_{ij} d_{aij}| \leq s_{ij2}, \ a \neq A_j$$

$$\lambda_i \geq 1 \quad (4)$$

$$\lambda_{ij} \geq 1.$$

The weight parameters with $w_{ij}$ in the objective function (3) are obtained from junction features, as described below. The LP provides us a solution for all slack variables $s_{ijk}$. For every edge (i,j) the slack variables $s_{ij1}$ and $s_{ij2}$ give us the minimal depth separation between line i and line j needed to obtain a lowest-cost globally consistent 3D interpretation of the scene. We use $(s_{ij1}+s_{ij2})$ as the edge cost and determine the minimal spanning tree, denoted by the edge set $E_s$. The scale factors $\lambda_i$ and $\lambda_{ij}$ can be determined directly from the linear system that corresponds to the tree-structured graph.)

Junction Costs

Under the Manhattan world assumptions, we use voting to determine junction features as penalty terms in the LP. The weight parameters $w_{ij}$ in Equation (3) corresponds to the penalty we impose when the constraint corresponding to the edge (i, j) is violated. These weights are modeled as a function of the junction features. If the function has a high value for a particular junction, then it is very unlikely that it may have a high score for a different junction.

Figure 7:
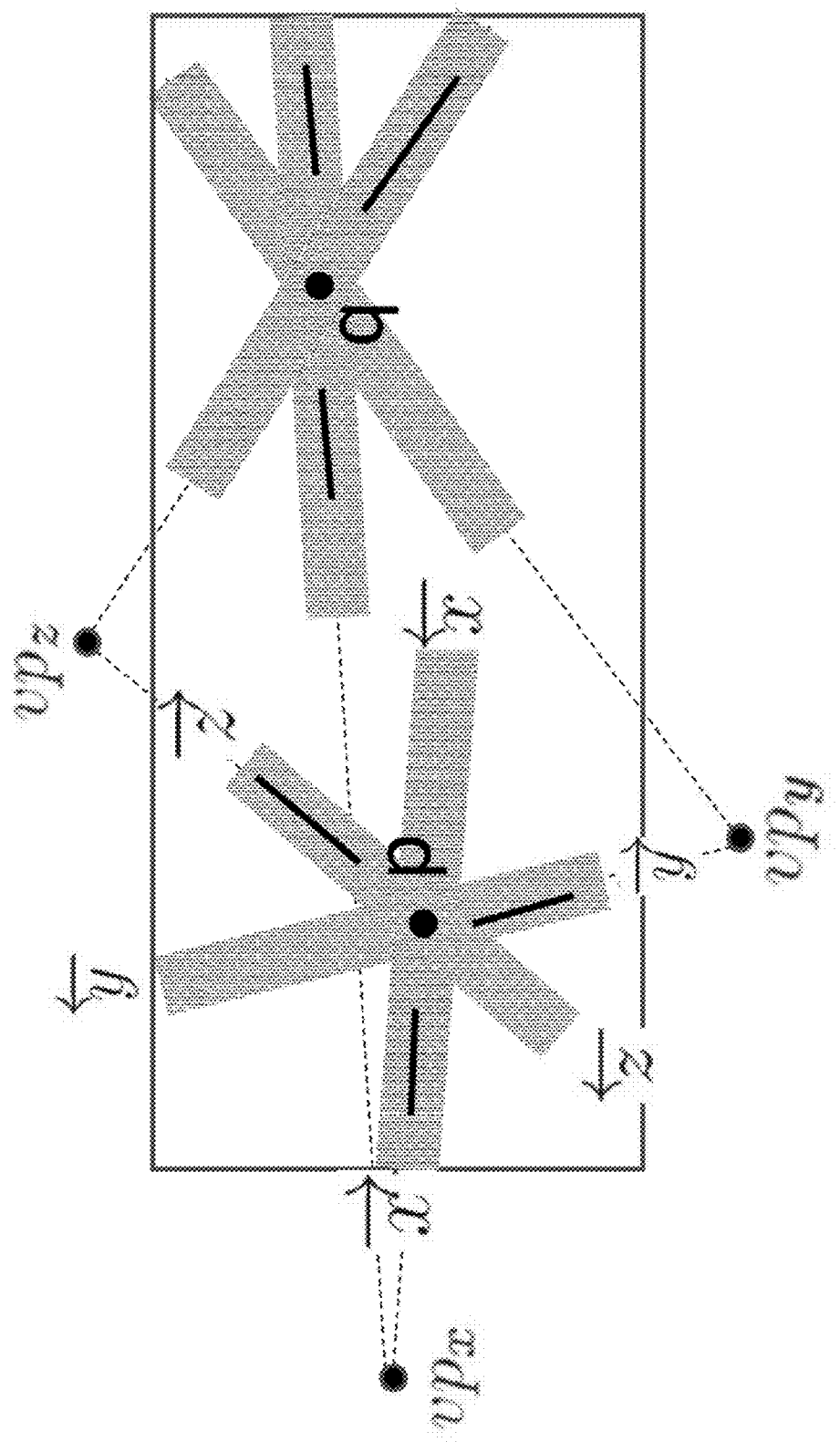
FIG. 7 is a schematic of junctions according to embodiments of the invention.

FIG. 7 shows the idea underlying our junctions and how to determine them. For every pixel in the image, there are six possible oriented regions with respect to the vanishing points $vp_x$, $vp_y$ and $vp_z$. These orientations are denoted by the set $$S=\{\bar{x},\vec{x},\bar{y},\vec{y},\bar{z},\vec{z}\}.$$

Every subset $A \subseteq S$ denotes a junction and one can determine a function F(A, p) for every possible subset A and pixel p. The value of the function gives a score to indicate the presence of a junction A at pixel p. For example, the Y junction at pixel p in FIG. 7 corresponds to the set $\{\bar{x},\bar{y},\bar{z}\}$. There is a T junction at pixel q.

The following are true for junctions on Manhattan scenes. L and X junctions occur on planar surfaces. T junctions occur on both planar surfaces and occluding boundaries. Y and W junctions are common on convex and concave edges.

Let J(p) denote the type of junction at pixel p, which denotes the intersection point that maps to edge (i,j) in the constraint graph. In the LP, we set the weight for $w_{ij}$ as $$w_{ij} = \begin{cases} C_h & \text{if } J(p) = Y \text{ or } W \\ C_m & \text{if } J(p) = X \\ 0 & \text{if } J(p) = T \\ 1 & \text{otherwise,} \end{cases}$$

where $C_h$ and $C_m$ are constants that are scaled according the quality of visual evidence for each junction, so that junctions obtained by extending lines have weaker penalties.

We do not give any preference to L junctions because T can sometimes be detected as L due to missing lines.

Applications

In one application the reconstruction is applied to multiple images of the scene to reconstruct large scenes. Another application uses the 3D lines for generating stereoscopic content. The camera can be mounted on a household appliance to reconstruct an indoor scene, and optimally control an airflow in a heating, ventilation and air-conditioning unit. The camera can also be mounted on a vehicle to detect obstacles, or a location of the vehicle.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for reconstructing-three-dimensional (3D) lines in a 3D world coordinate system from two-dimensional (2D) lines in a 2D image of scene, comprising:
    detecting and clustering the 2D lines using vanishing points;
    generating a graph of vertices and edges, wherein each vertex on the graph represents a line in the 2D image, and wherein each edge connecting two vertexes represents a possibility of a constraint on intersection of two lines corresponding to the two vertices in the 3D world coordinate system;
    testing jointly the constraints on intersections using orthogonality, collinearity and junction properties of the intersection as a soft penalty for identifying the constraints on intersections that are satisfied on the 3D lines; and
    reconstructing the 3D lines in the 3D world coordinate system using the identified constraints on intersections, wherein steps of the method are performed by a processor.

2. The method of claim 1, wherein the identifying uses linear programming.

3. The method of claim 2, wherein the penalty terms in the linear program uses L, X, T, W and Y junctions.

4. The method of claim 2, wherein a minimal spanning tree algorithm is used on the solution of the linear program to identify the satisfied constraints.

5. The method of claim 1, further comprising:
    reconstructing the scene using the 3D lines.

6. The method of claim 5, wherein a camera is mounted on a household appliance for reconstructing an indoor scene.

7. The method of claim 6, wherein the indoor scene reconstruction is used for optimal airflow control in a heating, ventilation and air-conditioning unit.

8. The method of claim 1, wherein the reconstruction is applied to multiple images.

9. The method of claim 8, wherein a camera is mounted on a car and the large scene reconstruction is used detecting obstacles.

10. The method of claim 8, wherein a camera is mounted on a car and the large scene reconstructed is matched with 3D city models for computing the location of a car.

11. The method of claim 1, wherein the 3D lines are used for generating stereoscopic content.

12. The method of claim 1, wherein the 3D lines are used to provide 3D context for object detection and recognition.

* * * * *